United States Patent Office 3,298,163
Patented Jan. 17, 1967

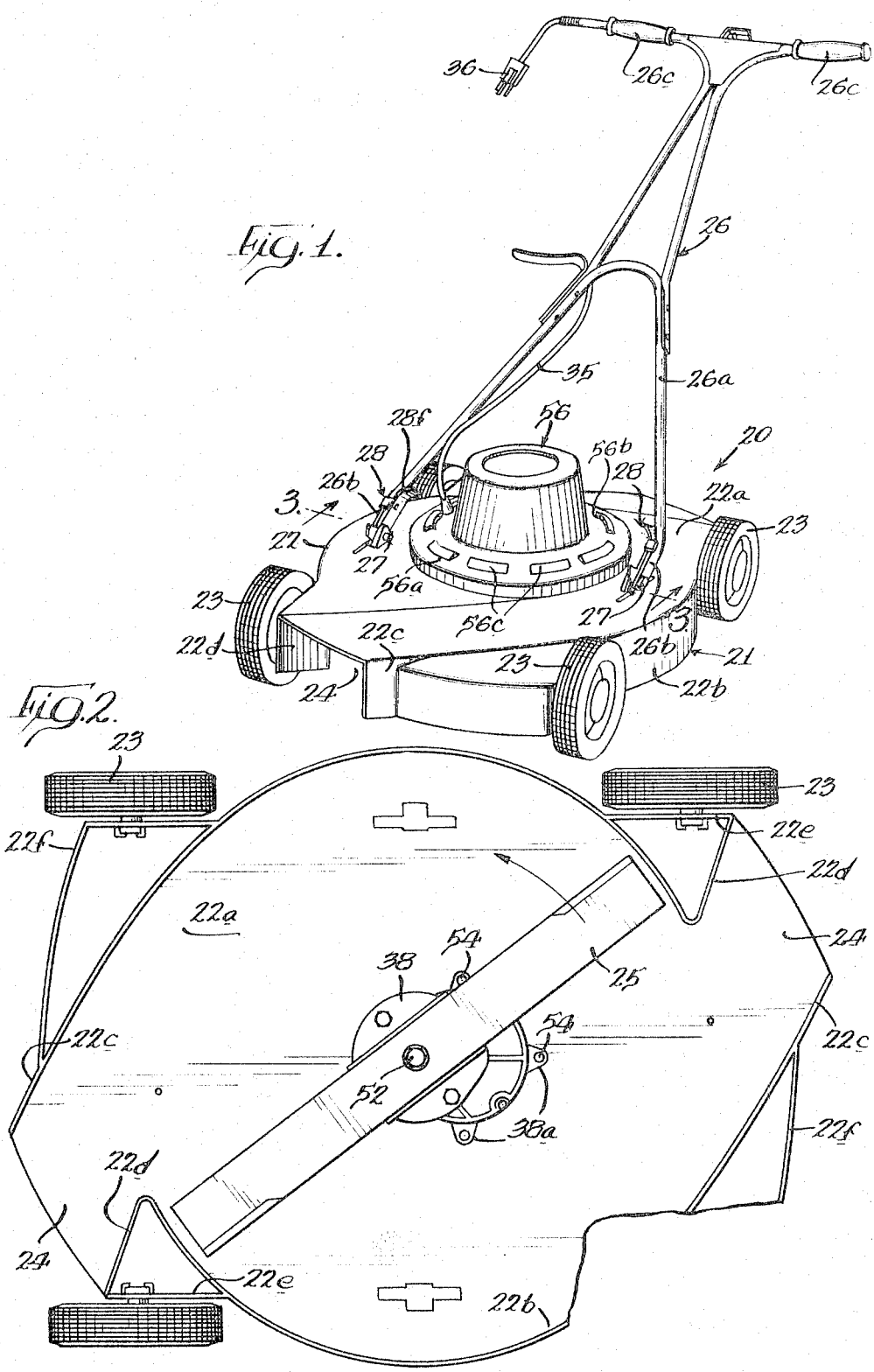

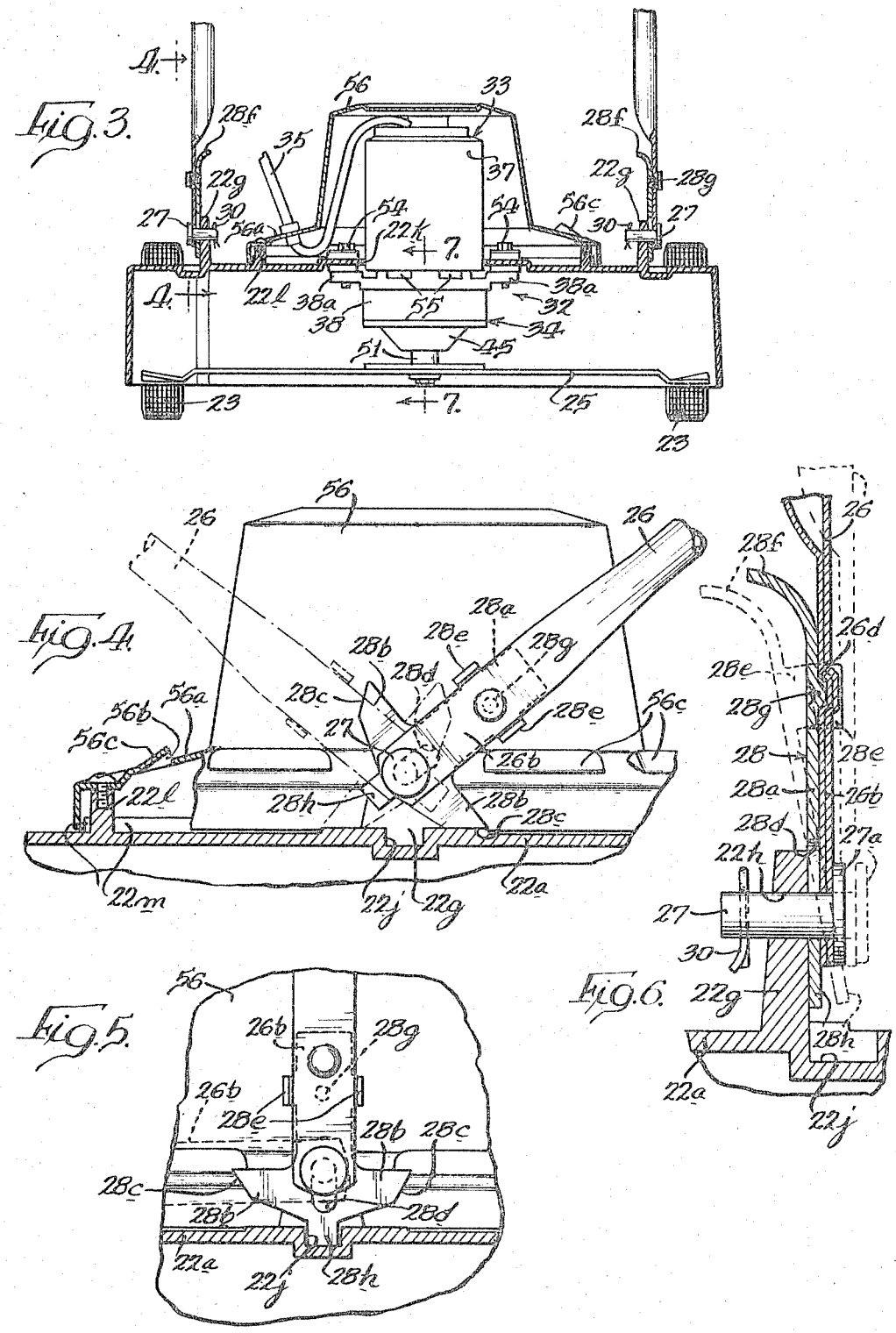

3,298,163
ROTARY ELECTRIC LAWN MOWER
Frederick O. Ottosen, Chicago, Charles A. Mattson, Oak Park, and Vello Laama, Lombard, Ill., assignors to Sunbeam Corporation, Chicago, Ill., a corporation of Illinois
Original application Aug. 28, 1961, Ser. No. 134,511, now Patent No. 3,144,258, dated Aug. 11, 1964. Divided and this application Apr. 7, 1964, Ser. No. 362,549
14 Claims. (Cl. 56—25.4)

In this application is a division of co-pending application Serial No. 134,511, filed August 28, 1961 and now Patent No. 3,144,258.

The present invention relates to lawn mowers and more particularly to power lawn mowers of the rotary type in which a motor driven shaft supports an elongated cutting blade for rotation in a horizontal plane.

Because of its simplicity in construction, the rotary lawn mower has become increasingly popular in recent years. Most of the current designs involve little more than a motor supporting deck having a peripheral flange extending downwardly to form a cutting chamber, a motor carried by the deck which is drivingly connected to a horizontally disposed blade positioned within the cutting chamber, wheels for supporting the deck, and a handle for propelling the unit across the lawn. While most of the rotary mowers sold today utilize internal combustion engines for driving the blade, there has been a marked increase in the sales of electric motor powered mowers. This increase is attributable in part to a recognition of the inherent advantages in an electric motor as compared to a gasoline engine as far as easy starting, low maintenance, cleanliness, etc. is concerned. This increase is also attributable to the solution of some of the problems associated with powering a lawn mower with electricity which must be supplied by means of an electric cord or cable. With the earlier electric powered lawn mowers much care was necessary to avoid cutting the power cable of the lawn mower. This problem was solved to a large extent by the use of the so-called flip-over or reversible handle which is described in Jepson Patent No. 2,926,478 on Multiple Blade Rotary Power Mower. That patent describes in detail the manner in which a lawn may be mowed with a reversible handle mower so that the possibility of cutting the mower power cord is virtually eliminated.

In brief, the reversible handle permits the user to mow successive adjacent swaths of grass without turning the mower around. The user merely pushes the mower toward the edge of the lawn being mowed, and upon arrival at the edge, the mower is moved laterally onto a swath of uncut grass. The handle is then reversed to permit the user to push the mower back in the direction from whence he came in cutting the previous swath. As a result of the mower not having to be turned around at the end of each swath, the cord may always extend from the same side of the mower toward the power source and there is little tendency for the user to pass the mower over the cord, thereby cutting it.

While the reversible handle is recognized as a desirable feature, the design of the cutting chambers of most rotary mowers are such that they must be operated in one particular direction if they are to function most efficiently. The conventional cutting chamber of a rotary mower would not, therefore, be suitable for use in a reversible handle mower. Accordingly, it would be desirable to have a rotary lawn mower in which the housing and associated cutting chamber are designed to be suitable for mowing in opposite directions while achieving good discharge of the grass clippings from the housing while mowing in either direction. It should be understood, of course, that a lawn mower which will operate effectively when moving either forward or backward is a distinct advantage even in mowers which do not have reversible handles and which are intended to be pushed in the same direction at all times. When cutting small or cramped areas of a lawn, it is not unusual to mow grass both when pushing the mower forward and when pulling it toward the operator.

Many of the present day rotary lawn mowers are characterized by the so-called staggered wheel design. In such a design one of the forward wheels of the mower has been displaced rearwardly to permit the discharge chute to extend toward the side of the mower. With the wheel on one side of the mower displaced in this way, it is impossible to mow close to objects on the side of the mower having the displaced wheel. Accordingly, only one side of the mower is designed to be effective in trimming close to buildings, fences, trees and the like. It would be desirable, therefore, to have the mower housing and its supporting wheels arranged so that the rotary blade of the mower extends past the wheels on both sides of the mower thereby permitting trimming with either side of the mover.

It has been a recognized objective in the design of lawn mower housings to provide a housing within which the grass is cut and discharged therefrom as soon as possible. The longer the cut grass remains within the housing to be circulated therein by the cutting blade, the more power is required to turn the blade. The necessity for any housing at all is dictated largely by safety considerations. Considerably less power would be required to turn the cutting blade if none of the power were consumed in carrying cut grass around the interior of a housing for an extra revolution or so of the blade. In view of the rapid rotation of the blade, a housing must be utilized which will enclose the rotating blade and protect the user from stones and other solid objects which might be encountered by the blade and thrown from the blade at high velocity. It would be desirable, therefore, to have a housing for the rotating blade which would protect the operator while maintaining at a minimum the power losses associated with moving cut grass around the interior of the housing.

In the design of a mower having a reversible or flipover handle, it is important that a mechanism be provided to support the handle in a simple manner so that it may be readily moved from one to the other of its positions of operation. In addition, it is desirable that means be provided to latch the mower handle in a vertical position for storage purposes. Such a latch is particularly necessary in an electric lawn mower since the handle is conventionally used in connection with cord storage. The cord is wound around the grip portion of the handle and a bracket spaced therefrom. Inasmuch as a suitable amount of cord for most yards weighs a considerable amount, the handle must be positioned vertically while the cord is stored thereon or the weight of the cord will unbalance the mower to such an extent that it will tilt over until the handle strikes the ground. It would be desirable, therefore, to provide a simple latch which would locate the handle in its two alternative push positions and, through simple manipulation of the latch, lock it in a vertical or storage position.

Use of an electric motor as a prime mover for a lawn mower creates certain problems not present in gasoline powered lawn mowers. One of the most significant is the fact that substantial quantities of air must be passed through the inside of the motor for cooling purposes. While this cooling air must be relatively clean and free from grass clippings, it would not be desirable to employ an air cleaner since it would reduce the flow of air substantially. Another problem inherent with the electric mower and in the gasoline engine is that of shielding the motor and its electrical connections from precipitation. Obviously, lawn mowers are occasionally used in inclement weather. Without proper shielding of the motor and the electrical connections, a serious shock hazard would be present. It would be desirable, therefore, to provide a cover or shroud for the motor and its electrical connections whereby this shock hazard would be reduced to a minimum and the air drawn in for cooling purposes would be free of cut grass.

To obtain satisfactory performance from an electric lawn mower, it has been found that the motor should operate at a very high rotational speed, in the order of 15,000 r.p.m. Inasmuch as the most desirable blade speed for an average rotary mower having a blade about 20 inches long is 3600 r.p.m., a speed reduction of about 4 to 1 must be introduced between the armature shaft and the blade supporting shaft. While such reduction is often accomplished by means of V belts, timing belts or the like, a gear reduction provides the most simple and compact approach to the problem of obtaining the lower blade speed. In most instances, however, it has been impossible to obtain a sufficiently low cost gear arrangement to make it practical for use on a lawn mower. In addition, there are problems associated with mounting the motor and the associated gearing on the deck of the lawn mower. It would be desirable, therefore, to provide an electric motor drive for a lawn mower having a gear reduction integrated therewith for mounting on the deck of a lawn mower.

One of the most serious repair problems which arises in connection with a rotary lawn mower is the replacement of damaged motor shafts resulting from the rotary blade striking a solid object. The inertia of the motor is such that the motor shaft tends to bend or twist when the blade is stopped suddenly. Because the replacement of a shaft is so expensive, many attempts have been made to provide slip clutches or overload clutches between the motor and the blade so that the motor may continue to rotate even after the blade has been stopped by encountering a solid object.

Such clutches are inherently expensive and subject to malfunction. It would be desirable, therefore, to have an overload clutch readily associated with the drive mechanism interconnecting the motor and the blade with little increase in cost. It would also be desirable if such a clutch could be located in a position where it would be enclosed and not subject to malfunctioning from becoming rusted or clogged with dirt and other foreign matter.

Accordingly, it is an object of the present invention to provide a new and improved power operated lawn mower having the various desirable features set forth above.

It is another object of the present invention to provide a rotary type power lawn mower which may be operated in either one of two directions with adequate discharge of clipped grass in either of the two directions.

It is a further object of the present invention to provide an improved handle mechanism for a reversible lawn mower.

It is a further object of the present invention to provide an improved protective shroud and air intake arrangement for an electric motor driven lawn mower.

Still another object of the present invention resides in an electric motor drive for a rotary lawn mower having the speed reduction means integrated with the motor housing.

Still another object of the invention is to provide an electric motor drive for a lawn mower having speed reduction and an overload clutch mechanism integrated with the motor.

A further object of the present invention resides in the mounting of an electric motor drive for a lawn mower extending below the deck of the mower housing to achieve a low silhouette for the mower.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

FIG. 1 is a perspective view of a power operated lawn mower built in accordance with the present invention;

FIG. 2 is a bottom view of the lawn mower of FIG. 1;

FIG. 3 is an enlarged sectional view taken along line 3—3 of FIG. 1;

FIG. 4 is an enlarged fragmentary sectional view taken along line 4—4 of FIG. 3 assuming that FIG. 3 shows a complete structure;

FIG. 5 is a fragmentary sectional view of FIG. 4 showing the handle and latch therefor in an alternative position;

FIG. 6 is an enlarged fragmentary sectional view of a portion of the handle and latch member shown in FIG. 3;

Figure 7:
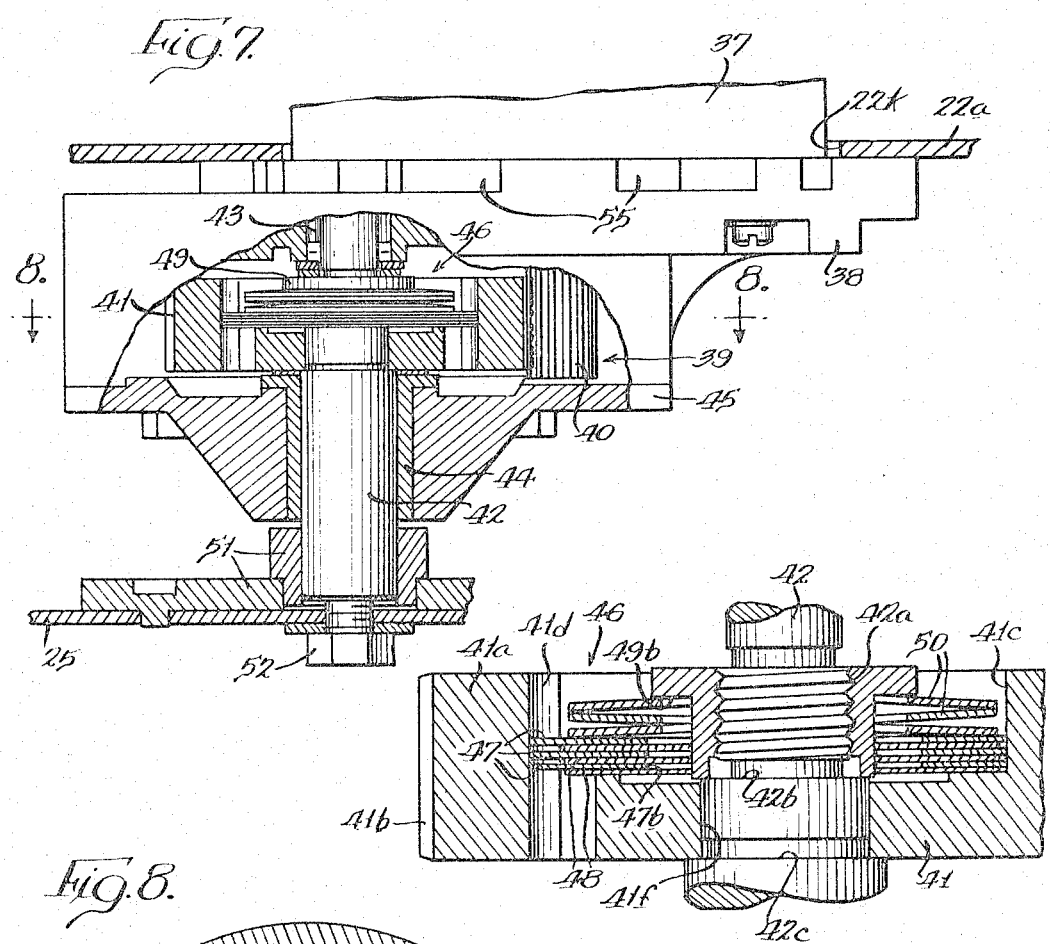
FIG. 7 is an enlarged fragmentary sectional view taken substantially along line 7—7 of FIG. 3.

Briefly, the present invention is concerned with a lightweight electric powered rotary type lawn mower having twin discharge chutes. A reversible handle is provided so that mowing in either of two opposite directions can be accomplished while permitting the power cord to extend from the same side of the mower. A simple handle support and latch mechanism are provided whereby the handle may be readily placed in any of three alternative positions. The electric motor for the mower is integrated with the speed reducing means and the slip clutch and is mounted extending through the deck of the mower. A shroud is provided for the motor to protect it from water and precipitation and to direct the air being drawn in to cool the motor.

Referring now to the drawings, there is illustrated a lawn mower generally indicated at 20 which comprises a carriage 21, including a housing or cutting chamber 22 supported on ground wheels 23. The housing 22 is formed with a generally horizontal deck portion 22a and a generally cylindrical downwardly extending side wall or skirt 22b.

The design of the housing or cutting chamber of a rotary lawn mower is very significant with respect to the proper discharge of grass therefrom. The cut grass has a tendency to build up on the interior of a mower housing, particularly when the grass is moist or wet. Most prior art mower housings have been designed essentially for unidirectional operation. Thus, the discharge chute for the housing is so arranged that effective discharge of grass clippings is accomplished only when the housing is pushed or driven in one particular direction. As has been explained above and in Jepson Patent No. 2,926,478, the use of an electric mower with its associated power cord is simplified considerably when the mower is provided with means for operating it in opposite directions.

To obtain good discharge of the grass from the housing or cutting chamber 22 when the mower is operated in either of two opposite directions, the skirt 22b is formed with openings or chutes 24 located at diametrically opposite positions in the skirt 22b. As may best be seen in FIG. 2, the chutes 24 extend substantially tangential to the circular or cylindrical housing 22. The outermost wall portions 22c defining the chutes 24 are actually tangential to the cylindrical portions of skirt 22b. Spaced across the exhaust chutes 24 from the outer wall portions 22c are inner wall portions 22d. The inner wall portions are short in length and are at a slightly diverging angle to the outer walls 22c. Rotatably supported within the housing 22 is an elongated blade 25. The tips of the blade 25 rotate close to the walls 22b and tend to prevent the build-up of any cut grass therein. The tangential arrangement of the chutes 24 facilitates the discharge of cut grass from the housing 22 since the centrifugal force acting on the pieces of grass being whirled around by the blade 25 tends to move the cut grass outwardly through the chutes 24. The smooth transition from the cylindrical portion of the skirt 22b to the tangential outer wall portions 22c of the chutes 24 tends to facilitate the discharge of grass therefrom.

While the housing 22 may be either of stamped sheet metal or a die cast construction, in the disclosed embodiment a die cast aluminum housing was utilized. To mount the ground wheels 23, the housing 22 is provided with walls 22e cast integrally with the housing 22. Two of the walls 22e extend between the terminal portions of inner walls 22d and the skirt 22b. The other two walls 22e which support the wheels remote from the discharge chutes 24 are connected to the outer wall portions 22c by walls 22f. It should be understood that the walls 22e and 22f merely function to mount the ground wheels 23 and have no purpose with respect to the cutting of grass and discharge of the cut grass from the housing 22.

The mower 20 is provided with a handle 26 which enables an operator to push the mower across the lawn. The handle 26 includes a lower U-shaped portion 26a having lower or terminal ends 26b which pivotally support handle 26 on the carriage 21 by means of a pair of trunnions 22g which are formed integrally with the housing 22 and extend upwardly from the deck 22a. At the upper end of the handle, two handle grips 26c are provided. The trunnions 22g are formed with openings 22h through which pins 27 extend to pivotally relate the lower ends 26b of the handle 26 to the trunnions 22g. The outer ends of the pins 27 are provided with enlarged heads 27a while the inner ends have suitable retaining means such as cotter pins 30 assembled thereto. Positioned between the lower ends 26b of handle and the trunnions 22g are handle latch members 28.

The latch members 28 are intended to locate the handle 26 in any one of three alternative positions. Two of the positions are angled driving positions as best shown in FIG. 4 in solid and dotted lines. The third position, as illustrated in FIG. 5, is the storage position in which the handle extends vertically with respect to carrige 21. The latch 28 is essentially T-shaped, being inverted with a leg 28a of the T extending parallel to the lower end 26b of the handle 26. Each latch 28 has a cross bar 28b, the outer ends of which are formed with sloping surfaces 28c. The sloping surfaces or stops 28c engage the deck 22a of the lawn mower to limit downward rotation and to locate the handle 26 in an angled position with the handle grips 26c at a convenient height for an operator pushing the mower across the lawn.

The latch members 28 are formed with elongated slots 28d through which the pins 27 extend. The slots 28d permit the latch members to be moved lengthwise with respect to the lower ends 26b of handle 26. Extending outwardly from the legs 28a are guide projections or tabs 28e which engage the lower handle ends 26b and guide the latch members 28 in sliding movement with respect to handle 26. The latch members 28 may be moved longitudinally by means of latch handles 28f which extend inwardly from the upper ends of the legs 28a.

To locate each latch 28 in its uppermost position with respect to the handle 26 there is formed a protuberance 28g positioned intermediate the guide tabs 28e. The protuberance 28g extends outwardly from the surface of the leg 28a toward the lower handle end 26b which includes a cooperating hole or recess 26d. The latch members 28 are sandwiched between the trunnions 22g by the resilient of the U-shaped handle portion 26a. The latches 28 may be moved to their lowermost positions by forcing of the latch handles 28f inwardly to disengage the protuberance 28g from the cooperating recess 26d and forcing the latch 28 downwardly at the same time. Each latch handle 28f is formed so that the release of the detent mechanism comprising the protuberance 28g and recess 26d and the downward movement of the latch may be accomplished by applying pressure with one's foot.

Extending away from the handle 26 and formed integrally with the latch 28 is a locking projection 28h which extends below the cross bar 28b of the latch member. As may best be seen in FIG. 5, the locking projection 28h is adapted to enter an upwardly facing recess 22j in the housing 22. As shown in FIG. 5 the latch member 28 has been moved to its lowermost position in which the pin 27 is at the upper end of the slot 28d. The locking projection 28h is then engaged in the housing recess 22j thus locking the handle 26 against pivotal movement with respect to the housing. It should be appreciated that the one-piece latch members 28 provide a simple and efficient means for positioning the handle in either one of its drive positions and for locking the handle in the vertical storage position shown in FIG. 5.

While the handle latch 28 is effective in positioning the handle 26 in either of its two drive positions or in a vertical storage position, there are occasions when it would be desirable to have the handle extending in a horizontal direction parallel to the deck of the mower. Thus when a steep bank or slope is being mowed, it is impossible to control the mower satisfactorily unless the handle may be moved to a position substantially parallel with the deck of the mower. In addition, when the mower is stored, it is advantageous to be able to hang the mower by the handle with the housing extending vertically, and therefore, occupying as little space as possible.

To move the handle to a position parallel to the deck of the mower, the latch members 28 need only to be pushed inwardly to the dotted line position shown in FIG. 6 whereupon the guide tabs 28e are disengaged from the lower handle portions 26b permitting relative rotation between the handle 26 and the latch members 28. The resilience of the U-shaped handle portion 28a tends to restrain the latch from being deflected to the dotted line position shown in FIG. 6. When force is exerted against the latch handle 28f, however, the latch member 28 pivots about the edge of the trunnion 22g so that the lower end thereof forces the lower handle portion 26b outwardly. Once the latch guide tabs 28e have been disengaged from the lower handle portions 26b, the handle 26 may be rotated to the horizontal position as illustrated in FIG. 5 by the dotted line showing of the handle portion 26b. It should be understood that the latches 28 may be completely disengaged in this manner when it is in any angular position including the vertical storage position shown in FIG. 5.

Mounted in the center of the deck 22a is a prime mover 32 which includes an electric motor 33 and its associated transmission or speed reducing mechanism 34. The motor 33 is of conventional design having a power cord 35 which passes upwardly through a portion of the handle to a connector 36 located adjacent the end of the handle 26. The motor 33 is enclosed in a cylindrical casting or housing 37, the lower end of which is open. To complete the motor housing, a second casting 38 is utilized which also serves to enclose the reduction gearing 39. The casting 38 may therefore be considered a combination motor housing closure member and transmission housing.

The housing or casting 38 comprises an inverted cup-shaped member within which a spur gear 40 formed integrally with the armature shaft and a spur gear 41 in driving engagement therewith are located. The spur gear 41, which may be termed the output gear, has many more teeth than the gear 40 and therefore results in a substantial reduction in speed between the gear 40 and the output of the gear reduction 34. The spur gear 41 is mounted on an output shaft 42 which is journalled in an upper bearing 43 mounted in the housing 38 and a lower bearing 44 which is received in a plate 45. The plate 45 cooperates with the transmission housing 38 to form the enclosure for the reduction gearing 39.

Figure 8:
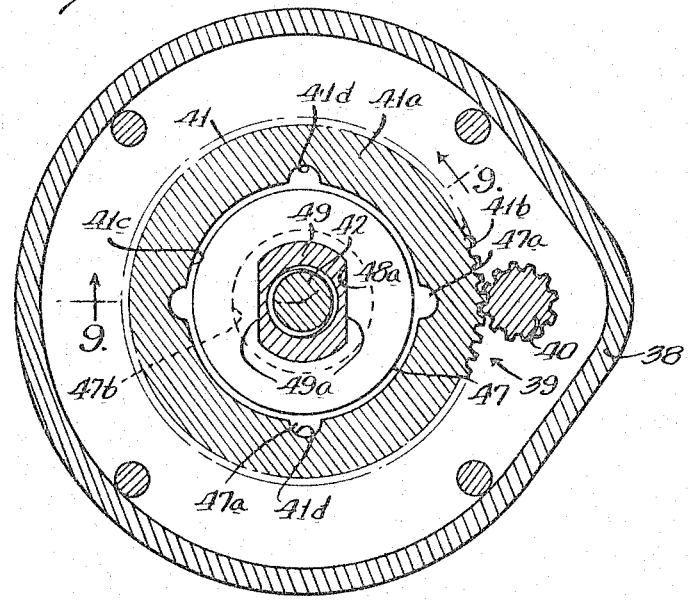
FIG. 8 is a sectional view taken along line 8—8 of FIG. 6 assuming that FIG. 6 shows the complete structure.
Figure 9:
FIG. 9 is an enlarged fragmentary sectional view taken on line 9—9 of FIG. 7.

The output gear 41 is made with a slip or overload clutch 46 integral therewith as is best shown in FIGS. 8 and 9. The gear 41 comprises an external annular portion 41a carrying gear teeth 41b and having a recess 41c within which the slip clutch mechanism is received. Spaced around the wall of the recess 41c are four equally spaced notches 41d. The notches 41d are formed by drilling holes through output gear 41 prior to counterboring the recess 41c. These holes therefore extend through the lower face of the gear 41 but serve no purpose other than in the forming of the notches 41d. The gear 41 is formed with an opening 41f through which the output shaft 42 extends. The opening 41f is of such size as to provide a slip or loose fit with respect to the output shaft 42. Torque is transmitted between the gear 41 and the shaft 42 by means of driving and driven friction discs 47 and 48, respectively. As may best be seen in FIG. 8, the driving friction discs 47 are formed with projections 47a which are adapted to be received in the notches 41d to establish the driving relation between the gear 41 and the discs 47. The discs 47 are provided with clearance openings 47b through which the output shaft 42 extends. The driven friction discs 48 are positioned between pairs of the driving discs 47 as may be seen in FIG. 8. The outer diameter of the discs 48 is substantially smaller than the inner diameter of the recess 41c so that there is no direct engagement between the driven discs 48 and the gear 41.

The driven discs 48 are drivingly related to the output shaft 42 by means of a pressure applying member 49 which is threadedly received on the output shaft 42. The member 49 is formed with flatted portions 49a which engage corresponding flatted portions 48a on the driven friction discs 48. The member 49 is formed with an annular shoulder 49b which overlies the friction discs 47 and 48 and serves to apply pressure to the stack of friction discs. This pressure is applied through a plurality of spring washers 50 which are clamped between the annular shoulder 49b and the uppermost driving discs 47.

The shaft 42 is provided with a threaded portion 42a and two shouldered portions 42b and 42c. In assemblying the gear 41 to the output shaft 42 the shaft 42 is inserted into the opening 41f until the lower surface of the gear 41 abuts the shoulder 42c. The friction discs 47, 48 and the spring washers 50 are then placed in the recess 41c. The pressure applying member 49 is then inserted into the openings in the friction discs and threaded onto the portion 42a of the output shaft 42. The pressure applying member is screwed onto the shaft 42 until the lower end of the member 49 abuts the shoulder 42b. The shoulders 42c and 42b are accurately spaced so as to obtain the proper amount of force applied by the spring washer 50 against the friction discs 47, 48.

In operation, the spur gear 40 on the end of the armature shaft of the electric motor 33 drivingly engages the teeth 41b of the gear 41. The driving friction discs 47 are rotated through the engagement of the gear notches 41d by the projections 47a on the friction discs. The driven friction discs 48 are then rotated by virtue of their frictional face-to-face engagement with the discs 47.

The amount of torque which may be transmitted by virtue of the frictional engagement is determined by the pressure applied through the spring washers 50. The driven friction discs 48 are keyed to the pressure applying member 49 by means of the flatted portions 48a and 49a on the discs and the member 49, respectively. Since the member 49 is secured to the output shaft 42, the discs 48 are drvingly related to the output shaft 42. A suitable hub 51 and assembly bolt 52 are provided to secure the blade 25 to the output shaft 42.

When the blade 25 strikes an obstruction and is arrested in its rotary movement, there is an instantaneous increase in the amount of torque being transmitted through the reduction gearing 39. This increase in torque is so high that it has a tendency to bend either the motor or output shaft or fracture the transmission gearing. The overload clutch is, however, effective in preventing any damage to the system. As the torque increases sharply a point is reached at which the friction discs 47, 48 rotate relative to each other thus limiting the torque in the system to the maximum torque which may be transmitted through the gear 41 and its overload clutch 46. While overload clutches of this general type are well known in the art, they have been unreliable and subject to many malfunctions. Since the friction members are called upon only infrequently to rotate relative to each other, they have a tendency to become rusted or corroded such that they will not permit the necessary relative rotation under conditions of high torque. The enclosure of the overload clutch in the transmission housing avoids exposure of the clutch to corrosive elements, dirt and other foreign matter.

The transmission housing or casting 38 is formed with mounting bosses 38a which extend outwardly around the periphery thereof as is best shown in FIG. 3. The deck 22a of the mower housing is provided with a centrally disposed opening 22k in which the prime mover 32 is mounted. Assembly bolts 54 extend through the deck 22a into threaded engagement with the mounting bosses 38a rigidly securing the prime mover 32 to the housing 22.

As is obvious from an inspection of FIG. 3 the prime mover 32 has a substantial portion extending below the level of the deck 22. The entire transmission 34 is located below the level of the deck. This arrangement has several advantages over the prior art lawn mower motor mounting arrangements. By placing the transmission within the cutting chamber of the mower the length of the output shaft 22 may be maintained at a minimum. It has been found that the bending and twisting, which frequently occurs in the output shaft when the blade strikes a solid object, is eliminated or reduced considerably by shortening the output shaft as much as possible. As an alternative to shortening the shaft, means have been provided to support the output shaft throughout its length whereby it has less tendency to bend or twist. In this last-mentioned alternative, elongated bearings extending downwardly from the roof of the mower housing have been employed to provide support for the output shaft. Since the housing 22 must be of reasonable depth to obtain satisfactory cutting and discharge of grass, any attempts at supporting the entire shaft length between the blade and the roof of the housing have been expensive and generally unsatisfactory. By moving the transmission into the mower housing, the entire output shaft may be easily supported and may have a minimum length.

It should also be appreciated that since the prime mover is assembled to the housing upwardly through the hole 22k with the mounting bosses 38a engaging the inside of the housing 22, the assembly of the prime mover 32, the blade 25 and the housing 22 is simplified. The prime mover and the blade may be preassembled and merely inserted upwardly into the housing 22 where it is assembled by means of bolts 54.

The electric motor 33 draws cooling air inwardly through the upper end of the housing 37 and discharges the air through openings 55 which are located between the transmission housing 38 and the motor housing 37. To prevent water and foreign material from entering the upper end of the motor 33, a cover or shroud 56 is mounted on the deck 22a completely covering the motor 33. The cover 56 is of inverted cup-shaped configuration with a peripheral flange 56a extending around the base thereof. On the upper surface of the flange 56a there are formed a plurality of air inlet openings 56b. The openings 56b are simply pierced in the flange 56a with the opening facing the motor 33. A portion 56c of the flange 56a is formed upwardly in piercing each opening 56b and acts as a baffle to limit the entry of foreign material into the space between the shroud 56 and the motor 33. The cover 56 is retained in position by means of screws 58 which extend through the flange 56a into threaded engagement with bosses 22L projecting upwardly from the surface of deck 22a. An integral flange or baffle 22m is provided on the deck 22a immediately inside the cover flange 56a to prevent air entering between the cover 56 and the deck 22a. Thus all of the cooling air for motor 33 must pass through the openings 56b moving downwardly and outwardly with respect to the motor 33. After the air has passed into the area below the flange 56a, it must move inwardly and upwardly in the space between housing 37 and the cylindrical portion of the shroud. Upon reaching the top of the inside of the shroud, the cooling air passes inwardly and downwardly into the motor 33. This tortuous path which must be followed by the motor cooling air tends to prevent any cut grass or any foreign material from being drawn into the motor 33.

While there has been illustrated and described a single embodiment of the present invention, it will be understood that various changes and modifications of the invention will occur to those skilled in the art. It is aimed in the appended claims to cover all such changes and modifications as fall within the true spirit and scope of the invention.

What is claimed as new and desired to be secured by Letters Patent of the United States is:

1. A lawn mower comprising a housing defining a cylindrical cutting chamber which is unobstructed and uncompartmented, a rotary cutting blade mounted for rotation about an axis coincident with the axis of said cylindrical chamber, a pair of discharge chutes extending horizontally from diametrically opposed sides of said housing, said chutes extending tangentially from the front and rear of said housing and being directed to discharge grass laterally of the lawn mower, a reversible handle pivotally connected to said housing and movable between forwardly and rearwardly inclined positions, four wheels supporting said housing, two of said wheels positioned forward of said blade axis and two positioned rearwardly of said blade axis, said wheels all being rotatably supported on said housing inwardly of the outer edge of said housing so trimming may be performed with either side of the mower.

2. A lawn mower comprising a cylindrical cutting chamber which is unobstructed and uncompartmented defined by a horizontal deck and side walls depending therefrom, front and rear supporting wheels secured to said housing inwardly of the outermost side edges of said housing, a pair of discharge chutes extending horizontally through said side walls at the front and rear of said housing and being directed to discharge grass laterally of the lawn mower, said chutes extending tangentially to said cylindrical housing, a reversible handle pivotally connected to said housing and movable between forwardly and rearwardly inclined positions, and a blade mounted in said housing for rotation in a horizontal plane, said blade extending beyond said wheels on both sides of the mower.

3. A lawn mower housing comprising a flat deck having side walls depending therefrom to form a cylindrical cutting chamber which is unobstructed and uncompartmented, a pair of exhaust chutes formed in diametrically opposed positions of said side walls on the front and back end of said housing, each chute having an inner and outer wall departing from said deck and being directed to discharge grass laterally of the lawn mower, said outer walls being tangential to said cylindrical cutting chamber and mutually parallel, said inner walls being spaced from said outer walls and connected to said side walls, a pair of wheel mounting walls depending from said deck outside of said cylindrical chamber on either side of each of said exhaust chutes, and wheels mounted on said walls and spaced inwardly of the outermost side edges of said housing.

4. A lawn mower comprising a housing having a deck and depending peripheral side walls forming a cutting chamber, a prime mover for said mower including an electric motor and transmission enclosed in a unitary casing, said deck being formed with a centrally disposed opening, means mounting said casing in said opening extending through said deck with said transmission positioned below said deck and within the cutting chamber, an output shaft extending from said casing and drivingly connected through said transmission to said motor, said transmission including speed reducing means drivingly interconnecting said motor and said output shaft, and a blade carried by said shaft and rotatable with said chamber, bearing means in said casing at the lower wall thereof positioned adjacent to said blade to minimize the unsupported portion of said shaft and prevent bending thereof.

5. A lawn mower comprising a housing having a deck and depending peripheral side walls forming a cutting chamber, wheels rotatably carried by said housing for supporting said housing for movement across a lawn, cutting means supported by said housing for rotation about a vertical axis, said cutting means being positioned adjacent the lower edges of said depending walls and spaced from said deck, a prime mover supported by said deck and extending downwardly therethrough, said prime mover being enclosed in a unitary casing which extends through an opening in said deck, mounting means intermediate the upper and lower ends of said casing supporting said casing with a substantial portion thereof within said cutting chamber, and an output shaft extending downwardly from said prime mover and carrying said cutting means at its lower end, said casing supporting an output shaft bearing in the lower wall thereof, said bearing being positioned closely adjacent to said cutting means and adjacent to the bottom of said cutting chamber.

6. A rotary lawn mower comprising a housing having a horizontal deck and depending vertical side walls forming a cutting chamber, a prime mover including an electric motor and a transmission enclosed in a casing, said transmission having reduction gearing and an overload clutch, mounting means on said casing intermediate the upper and lower ends thereof, assembly means securing said mounting means to said deck with said casing extending through said deck with said transmission positioned entirely under said deck within said cutting chamber, an output shaft on said prime mover, an elongated blade means carried by said shaft for rotation in a horizontal plane at the bottom of said cutting chamber, said blade being positioned immediately adjacent said transmission whereby said shaft is completely supported.

7. A rotary electric lawn mower comprising a carriage including ground engaging wheels and a deck supporting a prime mover thereon, a pair of inverted cup-shaped castings enclosing motor and transmission portions of said prime mover, mounting bosses positioned outwardly of the motor enclosing casting on the upper portion of the transmission enclosing casting, assembly means securing said bosses to the bottom of said deck whereby said transmission enclosing casting is positioned entirely below said deck, the motor enclosing casting being positioned above with its downwardly facing opening abutting said transmission casting, said deck being provided with an opening through which said motor casting extends in close spaced relation thereto, said motor having an armature shaft projecting downward into said transmission casting, an output shaft journalled in said transmission casting and drivingly connected to said armature shaft by reduction gearing, a closure plate secured to the mouth of said transmission casting and journalling said output shaft, and a cutting blade secured to said output shaft close to said closure plate.

8. A rotary electric lawn mower comprising an inverted cup-shaped housing formed by a deck and depending side walls, said deck having an opening in the center thereof, a prime mover mounted on said housing in said opening and including an electric motor drivingly connected to an output shaft through reduction gearing, said reduction gearing having an output gear mounted on said output shaft for rotation relative thereto, friction driving discs and driven discs received in a recess in said gear in face-to-face engagement for transmitting torque from said gear to said shaft, said driving discs and said driven discs being keyed to said gear and said shaft respectively, a casing enclosing said reduction gearing and said output shaft with the lower end of said shaft supporting a cutting blade immediately adjacent the bottom wall of said casing, a bearing in said bottom wall for rotatably supporting said output shaft adjacent said blade with a minimum unsupported length between said bearing and said blade, said casing being positioned entirely within said housing with said motor extending upwardly through said opening.

9. A lawn mower comprising a carriage supported by a plurality of wheels, grass cutting means mounted on the underside of said carriage, an electric motor mounted on said carriage and drivingly connected to said cutting means, said motor having a cylindrical housing extending vertically with openings at the upper end thereof and at the lower end thereof under said carriage, a fan driven by said motor for drawing cooling air into said housing through the upper openings and discharging said cooling air from the lower openings, an inverted cup-shaped shroud having a peripheral flange of conical shape, said shroud enclosing said motor with the outer edge thereof engaging said carriage, inwardly and upwardly facing air inlets spaced around said flange, said shroud being spaced from said motor housing to form a tortuous passageway through which said motor cooling air passes before entering said upper openings.

10. A lawn mower comprising a housing having a deck and peripherally depending side walls, a plurality of supporting wheels secured to said housing, a motor mounted on said deck and drivingly connected to grass cutting means under said deck, said motor having a cylindrical casing extending vertically, means drawing motor cooling air downwardly axially through said casing, an inverted cup-shaped shroud having cylindrical side walls spaced from the cylindrical walls of said casing and having a bottom spaced from the top of said casing, an outwardly and downwardly extending flange projecting from the bottom edge of said shroud side walls, and inwardly and upwardly facing openings in said flange permitting motor cooling air to pass outwardly and downwardly into the space between said flange and said deck, then inwardly to said casing, then upwardly between said cylindrical walls and into the upper end of said casing.

11. A lawn mower comprising a housing having a deck with depending side walls forming a cutting chamber, a grass discharge passageway in said side walls, a motor mounted on said deck and drivingly connected to grass cutting means in said chamber, said motor having means for drawing cooling air in at the upper end thereof and discharging said air below said deck, a cylindrical motor casing and a spaced shroud forming a tortuous passageway for air entering the upper end of said casing, said passageway having an entrance adjacent the deck of said mower opening toward said motor and away from said discharge passageway.

12. A lawn mower comprising a housing having a deck with depending side walls forming a cutting chamber, at least one grass discharge opening in said side walls, a motor mounted on said deck and drivingly connected to grass cutting means in said chamber, said motor having means for drawing cooling air in at the upper end thereof and discharging said air below said deck, a motor casing extending upwardly from said deck and a spaced shroud enclosing said casing and forming a tortuous passageway for said cooling air entering the upper end of said casing, said shroud having a flange engaging said deck at its outer edge and spaced from said deck inwardly of said edge, and entrances to said passageway formed in said flange facing toward said motor.

13. The lawn mower of claim 4 wherein said casing includes a motor enclosing portion and a sealed transmission enclosing portion, said motor enclosing portion having motor cooling air inlet opening at the upper end thereof and air discharge opening positioned below said deck.

14. The lawn mower of claim 13 wherein said motor enclosing portion of said casing is insertable into said opening upwardly through said deck and said transmission enclosing portion is formed with mounting means positioned radially outwardly from the axis of said motor, and assembly means securing said mounting means to the underside of said deck adjacent said opening.

References Cited by the Examiner
UNITED STATES PATENTS

| | | | |
|---|---|---|---|
| 2,766,573 | 10/1956 | Shewman | 56—25.4 |
| 2,983,096 | 5/1961 | Phelps | 56—25.4 X |
| 3,026,665 | 3/1962 | Hoff | 56—25.4 |
| 3,028,717 | 4/1962 | West | 56—25.4 |

ABRAHAM G. STONE, *Primary Examiner.*

ANTONIO F. GUIDA, *Examiner.*